(12) United States Patent
Delalandre et al.

(10) Patent No.: US 10,836,940 B2
(45) Date of Patent: Nov. 17, 2020

(54) NON-FLAMMABLE OR WEAKLY FLAMMABLE COOLING MIXTURES, CHARACTERISED BY LOW RELATIVE VOLATILITY FOR TWO-PHASE HEAT-EXCHANGE SYSTEMS

(71) Applicants: Safran Electrical & Power, Blagnac (FR); Centre National de la Recherche Scientifique (CNRS), Paris (FR); INSTITUT NATIONAL POLYTECHNIQUE de TOULOUSE, Toulouse (FR); UNIVERSITE DES SCIENCES ET TECHNOLOGIES DE LILLE, Villeneuve d'Ascq (FR); ECOLE NATIONALE SUPERIEURE DE CHIMIE DE LILLE, Villeneuve d'Ascq (FR)

(72) Inventors: Nicolas Delalandre, Blagnac (FR); Benjamin Roland Stanislas Joossen, Tatinghem (FR); Jean-Marie Aubry, Oignies (FR); Vincent Gerbaud, Merville (FR); Ivonne Rodriguez-Donis, Toulouse (FR)

(73) Assignees: Safran Electrical & Power, Blagnac (FR); Centre National de la Recherche Scientifique (CNRS), Paris (FR); INSTITUT NATIONAL POLYTECHNIQUE de TOULOUSE, Toulouse (FR); UNIVERSITE DES SCIENCES ET TECHNOLOGIES DE LILLE, Villeneuve d'Ascq (FR); ECOLE NATIONALE SUPERIEURE DE CHIMIE DE LILLE, Villeneuve d'Ascq (FR)

( * ) Notice: Subject to any disclaimer, the term of this patent is extended or adjusted under 35 U.S.C. 154(b) by 0 days.

(21) Appl. No.: 16/309,659

(22) PCT Filed: Jun. 15, 2017

(86) PCT No.: PCT/FR2017/051559
§ 371 (c)(1),
(2) Date: Dec. 13, 2018

(87) PCT Pub. No.: WO2017/216492
PCT Pub. Date: Dec. 21, 2017

(65) Prior Publication Data
US 2019/0233699 A1    Aug. 1, 2019

(30) Foreign Application Priority Data

Jun. 16, 2016  (FR) ...................................... 16 55577

(51) Int. Cl.
*C09K 5/04*        (2006.01)
*F28D 15/04*       (2006.01)

(52) U.S. Cl.
CPC ................ *C09K 5/044* (2013.01); *C09K 5/04* (2013.01); *F28D 15/04* (2013.01);
(Continued)

(58) Field of Classification Search
CPC .... C09K 3/00; C09K 5/044; C09K 2205/102; C09K 2205/104; C09K 2205/108;
(Continued)

(56) References Cited

U.S. PATENT DOCUMENTS

| 5,827,812 A | 10/1998 | Flynn et al. |
| 6,417,153 B1 | 7/2002 | Owens |

(Continued)

FOREIGN PATENT DOCUMENTS

| EP | 0 828 815 B1 | 10/2009 |
| JP | 2010185048 | * 8/2010 |
| WO | 00/36046 A1 | 6/2000 |

OTHER PUBLICATIONS

International Search Report of PCT/FR2017/051559 dated Aug. 31, 2017.

(Continued)

*Primary Examiner* — John R Hardee
(74) *Attorney, Agent, or Firm* — Sughrue Mion, PLLC

(57) ABSTRACT

The present invention relates to a cooling mixture comprising a fluorinated compound and a non-fluorinated compound, wherein the fluorinated compound is a hydrofluoroether and the non-fluorinated compound includes a carbonyl function, which has a flash point no lower than 23° C. and which is characterised by having low relative volatility. The present invention likewise relates to the use of such a mixture as a coolant in a heat-exchange device.

6 Claims, 3 Drawing Sheets

(52) U.S. Cl.
CPC .. *C09K 2205/102* (2013.01); *C09K 2205/104* (2013.01); *C09K 2205/108* (2013.01); *C09K 2205/112* (2013.01); *C09K 2205/24* (2013.01); *C09K 2205/32* (2013.01)

(58) Field of Classification Search
CPC ........ C09K 2205/112; C09K 2205/126; C09K 2205/24; C09K 2205/32; C09K 2208/08; C09K 2208/24; C09K 5/04; C09K 8/52; C09K 8/582; C09K 8/685
See application file for complete search history.

(56) References Cited

U.S. PATENT DOCUMENTS

| | | | |
|---|---|---|---|
| 6,660,709 | B1 | 12/2003 | Dournel et al. |
| 7,476,331 | B2* | 1/2009 | Merchant ................ C07C 19/08 252/67 |
| 2006/0180785 | A1* | 8/2006 | Merchant ................ C07C 19/08 252/67 |

OTHER PUBLICATIONS

Aage Fredenslund, et al., "Group-Contribution Estimation of Activity Coefficients in Nonideal Liquid Mixtures", AIChE Journal, Nov. 1975, pp. 1086-1099, vol. 21, No. 6 (14 pages total).

Le Chatelier, "Annals of Mines 19", 1891, pp. 388-395 (3 pages total).

Horng-Jang Liaw, et al., "Prediction of miscible mixtures flash-point from UNIFAC group contribution methods", Fluid Phase Equilibria, 2011, pp. 70-82, vol. 300 (13 pages total).

* cited by examiner

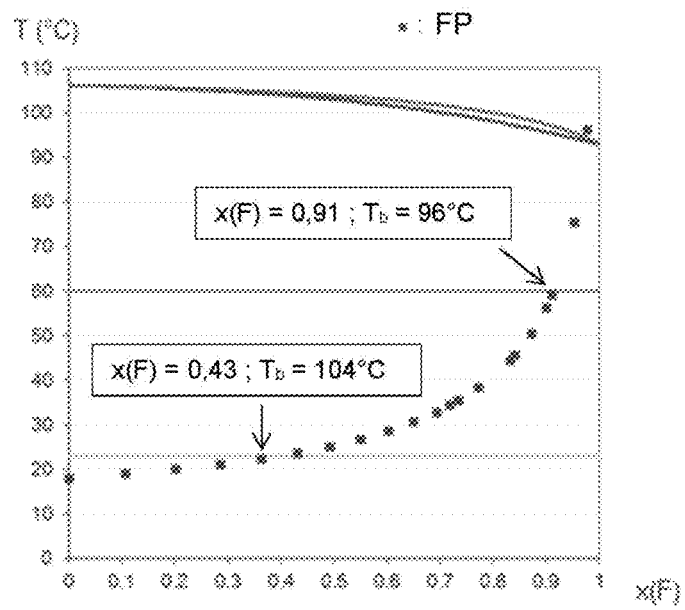
Fig. 3.a
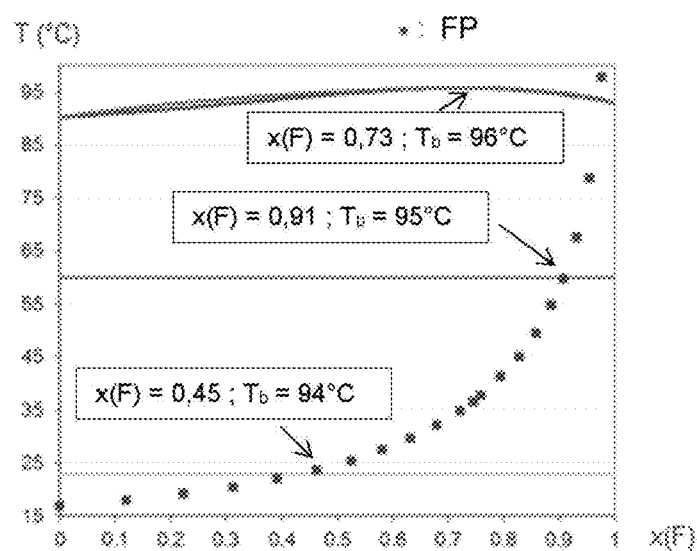
Fig. 3.b

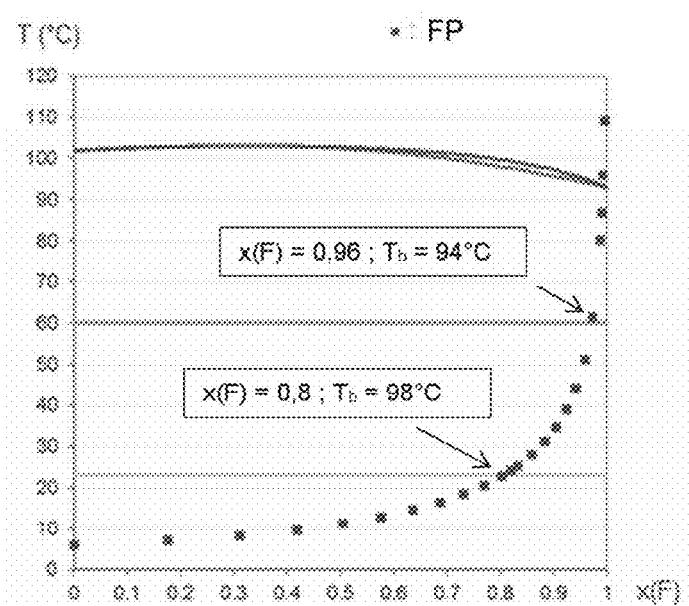
Fig. 3.c

NON-FLAMMABLE OR WEAKLY FLAMMABLE COOLING MIXTURES, CHARACTERISED BY LOW RELATIVE VOLATILITY FOR TWO-PHASE HEAT-EXCHANGE SYSTEMS

CROSS REFERENCE TO RELATED APPLICATIONS

This application is a National Stage of International Application No. PCT/FR2017/051559 filed Jun. 15, 2017, claiming priority based on French Patent Application No. 1655577 filed Jun. 16, 2016, the disclosures of each of which are herein incorporated by reference in their entireties.

The present invention concerns the field of heat-transfer fluids for heat exchangers, such as capillary- or mechanically-pumped two-phase exchangers.

The choice of heat-transfer fluid for a two-phase heat exchanger is of the utmost importance. Indeed, the operating principle of a two-phase heat-exchange system is based on the evaporation and condensation of a so-called heat-transfer fluid, in that it allows heat exchanges. Hence, the performance of the device and its suitability for a given environment depend largely on the properties of the fluid. In the case of capillary-pumped two-phase exchangers, for example, the movement of the fluid is directly affected by its wettability with the porous structure of the exchanger.

The refrigerant fluids commonly used in two-phase cooling systems are mainly pure substances, namely ammonia, methanol, acetone, and ethanol. However, their use proves to be particularly dangerous, insofar as the first two are toxic (the median lethal dose, $LD_{50}$, of ammonia is only 350 mg/kg), while the other two are highly flammable (the flash points, denoted FP, of acetone and ethanol are −20° C. and 13° C., respectively).

Besides the safety requirements, the heat-transfer fluid must have characteristics that ensure good performance as a refrigerant liquid. Thus, high enthalpies of vaporization ($\Delta H_{vap}$ hereinafter), heat capacity and thermal conductivity favour heat exchanges and thus make it possible to design lighter, more compact heat exchangers, which is an undeniable advantage for applications in the transport sector (automobiles, planes, trains) in particular.

Water might appear to be the ideal candidate. Indeed, it is a non-toxic, non-flammable compound with a very high enthalpy of vaporization, above 2000 kJ/kg, all criteria that a good heat-transfer fluid must meet. Nevertheless, its freezing point ($T_f$ hereinafter) is much too high, which drastically restricts its potential applications. Indeed, water freezes at 0° C., while a fluid must exist in the liquid state at lower temperatures in order to be considered for use in a cooling system integral to a transport vehicle, for example. It is therefore important that the heat-transfer fluid has a sufficiently low freezing point, while having a boiling point ($T_b$) compatible with the desired operating conditions. In particular, it is necessary that the fluid has a good volatility, reflected in a moderate boiling point (typically $T_b$ below 120° C. under 1 atm pressure) at the operating pressure.

Consequently, the number of characteristics that a heat-transfer fluid must have is such that it is difficult to find a pure compound that is fully satisfactory. Therefore, the use of mixtures is necessary in order to overcome the deficiencies of a pure fluid in relation to one or more specifications.

For example, mixtures of water and ethylene glycol are frequently used in industrial cooling systems, notably in transport vehicle radiators, despite the acute toxicity of ethylene glycol, which acts as antifreeze in the mixture.

Nevertheless, mixtures have a major disadvantage in terms of their use in a two-phase heat-exchange system, which is related to their very nature. Indeed, when a mixture evaporates, the vapour and liquid phases in equilibrium generally have different compositions, which can lead to partial vaporization or condensation phenomena, resulting in a degradation of the thermal performance of the heat exchanger in which the mixture is incorporated.

This problem can be avoided by favouring the use of azeotropic mixtures, which has already been proposed in the literature. By definition, an azeotrope is a mixture of two or more compounds that behaves like a pure substance, in that in the so-called azeotropic composition, the vapour and liquid phases have the same composition. As a result, a change in the liquid-vapour state at constant pressure does not lead to any change in the composition of the vapour phase. Thus, binary or ternary azeotropic mixtures are marketed as refrigerant fluids by the company 3M in particular.

3M was the first to develop solvents containing hydrofluoroethers (HFEs) for various industrial applications, such as steam degreasing, cold cleaning and cooling systems based on the use of a heat-transfer fluid. These compounds were proposed as substitutes for hydrofluorocarbons (HFCs), which were themselves an alternative to chlorofluorocarbons (CFCs) and hydrochlorofluorocarbons (HCFCs), widely used in the past as refrigeration fluids and aerosol propellants. While HFCs do not directly degrade stratospheric ozone unlike their chlorinated analogues, they are nevertheless included in the list of the Kyoto Protocol's main greenhouse gases, due to their contribution to global warming quantified by a very high global warming potential (GWP).

New-generation solvents with one or more HFEs are marketed by 3M as refrigerant fluids in the electronics sector, but also for domestic and industrial refrigeration systems such as refrigerators, heat pumps, air conditioning systems, and for the thermal management of chemical reactors.

The 3M™ Novec™ range of heat-transfer fluids offers many advantages. First, they do not pose a danger to humans or the environment, insofar as they are non-flammable and non-toxic, do not cause ozone depletion, and have a very low GWP due to a reduced lifetime in the atmosphere. In addition, their freezing points are extremely low, and depending on the HFE used, the boiling point can be very different, allowing uses under various conditions. However, these commercial products have an enthalpy of vaporization below 150 kJ/kg, which is too low for them to be considered effective from a heat-exchange point of view. Table 1 below summarizes the physicochemical characteristics of certain HFEs in the 3M™ Novec™ range.

TABLE 1

Properties of the 3M ™ Novec ™ range of refrigerants

| 3M ™ Novec ™ | GWP | FP (° C.) | $T_f$ (° C.) | $T_b$ (° C.) | $\Delta H_{vap}$ (kJ/kg) |
|---|---|---|---|---|---|
| HFE 7000 1-methoxyheptafluoropropane | 370 | None | −122 | 34 | 142 |
| HFE 7100 1-methoxynonafluorobutane | 320 | None | −135 | 61 | 112 |
| HFE 7200 1-ethoxynonafluorobutane | 55 | None | −138 | 76 | 119 |

TABLE 1-continued

Properties of the 3M ™ Novec ™ range of refrigerants

| 3M ™ Novec ™ | GWP | FP (° C.) | $T_f$ (° C.) | $T_b$ (° C.) | $\Delta H_{vap}$ (kJ/kg) |
|---|---|---|---|---|---|
| HFE 7300 1,1,1,2,2,3,4,5,5,5-decafluoro-3-methoxy-2-trifluoromethylpentane | 200 | None | −38 | 98 | 102 |
| HFE 7500 2-trifluoromethyl-3-ethoxydodecafluorohexane | 210 | None | −110 | 128 | 88 |

Mixing an HFE and a non-toxic organic solvent having a good heat capacity can overcome the deficiencies of the fluorinated compound in terms of thermal performance. Indeed, the mixture benefits from the enthalpy of vaporization of a well-chosen organic solvent, while HFE acts as a flame retardant and lowers the flash point of the solvent to meet strict safety requirements. Thus, it is desirable that the mixture be weakly flammable (category 3 according to the European classification), which corresponds to a flash point (FP) such as 23° C.≤FP<60° C., or non-flammable (category 4), i.e. with a FP of 60° C. or above.

Azeotropic compositions containing 3M™ Novec™ 7100 HFE, which actually corresponds to two inseparable isomers (1-methoxyperfluorobutane and 1-methoxynonafluoroisobutane), mixed with various organic solvents, have been patented by 3M (EP 0 828 815 B1 and U.S. Pat. No. 5,827,812 A). The organic solvents used consist essentially of alcohols, ethers, chlorinated compounds and fluoro-alcohols. Table 2 below shows the composition and boiling temperature of certain azeotropes proposed in the above-mentioned European patent, as well as their flammable or non-flammable (FP above 60° C.) nature.

TABLE 2

Azeotropes described in patent EP 0828815B1

HFE: 0.35% 1-methoxyperfluorobutane (by total weight) 0.65% 1-methoxynonafluoroisobutane (by total weight) azeotrope

| Solvent | $T_b$ (° C.) | HFE mass fraction | Flammable? |
|---|---|---|---|
| Methanol | 45.8 | 0.896 | Yes |
| Ethanol | 52 | 0.934 | Yes |
| Propanol | 56.2 | 0.974 | No |
| Iso-butanol | 58.3 | 0.988 | No |
| Tert-butanol | 55.8 | 0.938 | No |
| Hexafluoro-propan-2-ol | 52.5 | 0.575 | No |

Almost all of the non-flammable azeotropic mixtures proposed in the patent have an HFE mass fraction (denoted x hereinafter) above 0.9. The result is an enthalpy of vaporization close to that of HFE, which is consequently unsatisfactory.

The applicant calculated the liquid-vapour equilibria of the various mixtures according to said patent using the original UNIFAC thermodynamic model (Fredenslund et al., AIChE J. Vol. 21 1975).

The diagram obtained for the mixture with methanol (FIG. 1) shows a major disadvantage characteristic of HFE—alcohol azeotropes. Indeed, when the composition of the mixture deviates slightly from that of the azeotrope, the relative volatility quickly exceeds 1.5, so that the vapour and liquid phases have substantially different compositions, resulting in the phenomenon of partial vaporization of the mixture, which would impair the efficiency of the heat exchanger in which it would be incorporated. In practice, the variation in the composition of the mixture with respect to the azeotropic point may result from a simple and small pressure variation within the device.

The binary diagram of the most promising patented mixture in terms of thermal performance, in that the HFE mass fraction of the azeotrope is only 0.575, has a radically different appearance (FIG. 2). Indeed, it should be noted that the relative volatility of the mixture consisting of 3M™ Novec™ 7100 HFE (0.35% 1-methoxyperfluorobutane, 0.65% 1-methoxynonafluoroisobutane by weight based on total weight) and hexafluoropropan-2-ol is close to unity regardless of the composition of the mixture, thus avoiding the phenomenon of partial vaporization.

The present invention thus aims to propose novel non-toxic and environmentally friendly refrigerant mixtures, which can be used under various conditions without departing from safety requirements, while ensuring the efficiency of the heat exchanger in which they are incorporated.

The latter specification may be expressed in the form of two criteria that the mixtures of the invention must meet:
- the mixture can store a large amount of heat, which can be expressed by an enthalpy of vaporization above 150 kJ/kg for a weakly flammable mixture (category 3) and above 100 kJ/kg for a non-flammable mixture (category 4).
- the composition of the mixture does not vary under the effect of a small pressure variation. Said mixture must therefore have a low relative volatility over a wide range of composition, a characteristic that is reflected in a composition—temperature or composition—pressure diagram by a flattened family of boiling-point and dew-point curves.

The applicant has solved this technical problem by developing novel refrigerant mixtures that meet all the criteria listed above.

The present invention thus relates to a refrigerant mixture comprising a fluorinated compound selected from a hydrofluoroether, a fluoro-alcohol and a fluoro-alkane, and a non-fluorinated compound having a carbonyl or alcohol function, which has a flash point of 23° C. or above and which is characterized by a low relative volatility, exclusive of a mixture consisting of a hydrofluoroether and a non-fluorinated compound having an alcohol function.

The invention also relates to the use of such a mixture as heat-transfer fluid in a heat exchanger such as a two-phase exchanger.

BRIEF DESCRIPTION OF THE DRAWINGS

The present invention further relates to a heat-exchange device comprising as heat-transfer fluid a mixture according to the invention.

FIGS. 3.a-3.c list the composition temperature binary diagrams of the liquid vapour equilibria of certain mixtures according to the invention, characterized by flattened families of dew-point and boiling-point curves. A given diagram also shows the flash point value of the corresponding mixture as a function of the fluorinated compound mass fraction, x(F). The original UNIFAC thermodynamic model was used to calculate the liquid-vapour binary equilibrium and to calculate the flash point using Le Chatelier's rule (Annals of Mines 19, 388-395. 1891) for binary mixtures with a non-flammable component (Liaw H-J et al., Fluid Phase Equilibria. 300. 70-82. 2011). The resulting mixture enthalpy of vaporization is calculated by linear interpolation as a function of the mass composition.

FIG. 3.a corresponds to the binary diagram of the mixture: 1,1,2,2-tetrafluoroethyl-2,2,3,3-tetrafluoropropylether and butyl formate.

FIG. 3.b corresponds to the binary diagram of the mixture: 1,1,2,2-tetrafluoroethyl-2,2,3,3-tetrafluoropropylether and dimethyl carbonate.

FIG. 3.c corresponds to the binary diagram of the mixture: 1,1,2,2-tetrafluoroethyl-2,2,3,3-tetrafluoropropylether and pentan-3-one.

Figure 1:
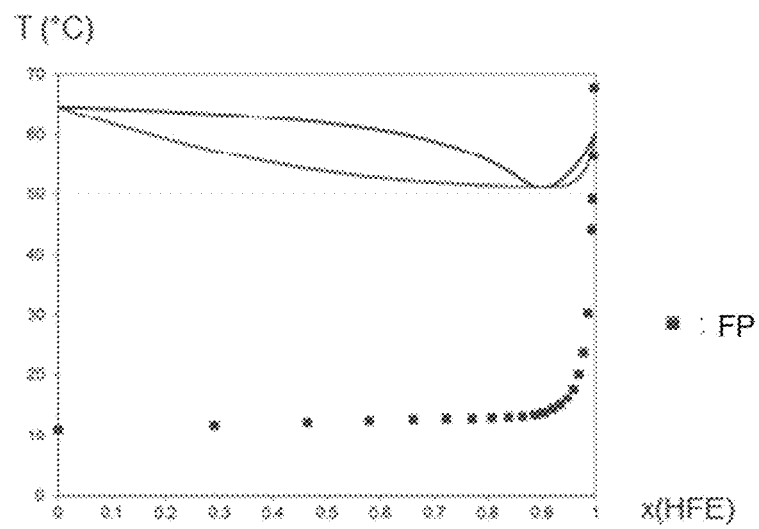
FIG. 1 shows the composition—temperature diagram of the liquid-vapour equilibrium of the mixture consisting of 3M™ Novec™ 7100 HFE (0.35% 1-methoxyperfluorobutane, 0.65% 1-methoxynonafluoroisobutane by weight based on total weight) and methanol. The diagram also shows the flash point value of the mixture as a function of the HFE mass fraction, x(HFE).
Figure 2:
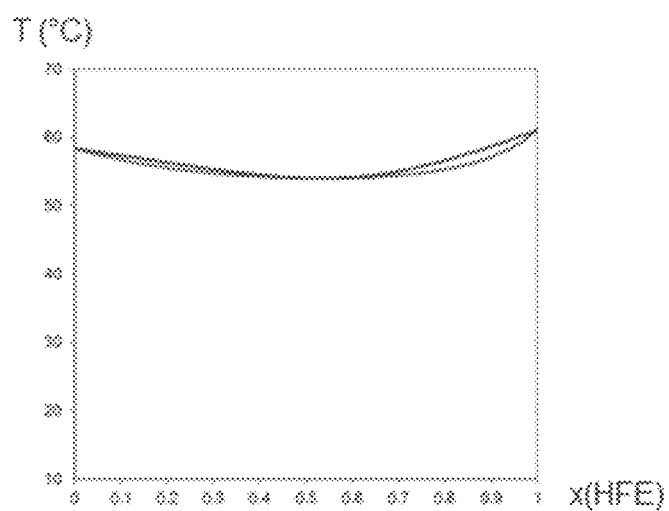
FIG. 2 shows the composition—temperature diagram of the liquid-vapour equilibrium of the mixture consisting of 3M™ Novec™ 7100 HFE (0.35% 1-methoxyperfluorobutane, 0.65% 1-methoxynonafluoroisobutane by weight based on total weight) and hexafluoropropan-2-ol.

For the purposes of the present invention, "FP" or "flash point" means the minimum temperature expressed in degrees Celsius at which a combustible substance emits vapours in a concentration sufficient to form a gaseous mixture with ambient air that ignites upon contact with a flame or hot spot, but insufficient for combustion to propagate by itself in the absence of said pilot flame. According to Regulation (EC) No 1272/2008 of the European Parliament and of the Council of 16 Dec. 2008 on classification, labelling and packaging of substances and mixtures, a fluid with an FP such as $23° C. \leq FP < 60° C.$ belongs to the "weakly flammable" category 3, the "non-flammable" category 4 corresponding to an FP of 60° C. or above.

"Flame retardant" means, for the purposes of the present invention, a substance whose function is to reduce the flash point of another compound.

A hydrofluoroether or HFE, also called fluoroether in the literature, is, for the purposes of the present invention, an ether $R_1$—O—$R_2$ in which some or all of the hydrogen atoms of the hydrocarbon chains $R_1$ and $R_2$ are replaced by fluorine atoms.

Similarly, fluoro-alcohol means, for the purposes of the present invention, an alcohol $R_3$—OH in which some or all of the hydrogen atoms in the hydrocarbon chain $R_3$ are replaced by fluorine atoms.

A fluoro-alkane is, for the purposes of the present invention, an alkane, i.e. a saturated hydrocarbon, in which some or all of the hydrogen atoms are replaced by fluorine atoms.

For the purposes of the present invention, the "global warming potential", or "GWP", is a comparative index associated with a greenhouse gas, which quantifies its marginal contribution to global warming compared with that of carbon dioxide over a 100-year period.

A mixture with a "low relative volatility" refers, for the purposes of the invention, to a mixture that has a relative volatility close to unity over a wide range of composition, which is reflected in a liquid-vapour equilibrium diagram by almost coincident boiling-point and dew-point curves, thus forming a flattened family of curves, as in FIGS. 3.a, 3.b and 3.c. It should be noted that the existence of an azeotropic point is a condition that is neither necessary nor sufficient for such a flattening to emerge.

The present invention relates, first, to a refrigerant mixture comprising a fluorinated compound selected from a hydrofluoroether, a fluoro-alcohol and a fluoro-alkane, and a non-fluorinated compound having a carbonyl or alcohol function, which has a flash point of 23° C. or above and which is characterized by a low relative volatility, exclusive of a mixture consisting of a hydrofluoroether and a non-fluorinated compound having an alcohol function.

Such a mixture may optionally have an azeotropic point. That being the case, it necessarily has a low relative volatility over the composition range of interest.

Advantageously, a refrigerant mixture according to the invention may therefore comprise a non-fluorinated compound that has a carbonyl function, also called a carbonyl compound in the following description, such as an ester, a carbonate, a ketone or an aldehyde.

Ester means, more particularly, a compound $R_4$—CO—$OR_5$, wherein $R_4$ and $R_5$ are hydrocarbon chains which may, according to the invention, independently be linear or branched, and contain between 1 and 10 carbon atoms.

Carbonate means, more particularly, a compound $R_6$O—CO—$OR_7$, wherein $R_6$ and $R_7$ are hydrocarbon chains which may, according to the invention, independently be linear or branched, and contain between 1 and 10 carbon atoms.

Ketone means, more particularly, a compound $R_8$—CO—$R_9$, wherein $R_8$ and $R_9$ are hydrocarbon chains which may, according to the invention, independently be linear or branched, and contain between 1 and 10 carbon atoms.

Aldehyde means, more particularly, a compound $R_{10}$—CO—H, wherein $R_{10}$ is a hydrocarbon chain which may, according to the invention, be linear or branched and contain between 1 and 10 carbon atoms.

In particular, the carbonyl compound may be selected from butyl formate, tert-butyl acetate, propyl acetate, methyl ethyl carbonate, dimethyl carbonate and pentan-3-one.

The non-fluorinated compound of a mixture according to the invention may, in another embodiment, have an alcohol function.

Alcohol more particularly refers to a compound R—OH, wherein $R_{11}$ is a hydrocarbon chain which may, according to the invention, be linear or branched, and contain between 1 and 10 carbon atoms, preferentially between 2 and 6 carbon atoms.

Advantageously, the alcohol is selected from ethanol, propanol and propan-2-ol.

In addition to a non-fluorinated compound, a mixture according to the invention comprises a fluorinated compound.

Advantageously, the fluorinated compound may be a hydrofluoroether.

According to one embodiment, the hydrocarbon chains $R_1$ and $R_2$ of said hydrofluoroether may independently be linear or branched, advantageously saturated, and contain between 1 and 10 carbon atoms.

Preferentially, the hydrofluoroether has at least 5 fluorine atoms, and preferably at least 8 fluorine atoms.

In a particular embodiment, $R_1$ is an alkyl group containing from 1 to 3 carbon atoms, and notably a methyl group.

In another embodiment, $R_2$ is a perfluorinated hydrocarbon chain, i.e. a hydrocarbon chain in which all the hydrogen atoms are replaced by fluorine atoms. $R_2$ then preferably has at least 3 carbon atoms, and more preferably its number of carbon atoms is comprised between 5 and 8.

In a variant embodiment, $R_1$ is an alkyl group having 1 to 3 carbon atoms, such as methyl, and $R_2$ is a perfluorinated hydrocarbon chain which preferably has a number of carbon atoms between 3 and 8, notably between 4 and 6, such as perfluorobutyl, perfluorohexyl and perfluoro-2-methylpentyl.

Alternatively, $R_1$ and $R_2$ may each independently contain at least one hydrogen atom.

According to one embodiment, $R_1$ and $R_2$ are partially fluorinated hydrocarbon chains having from 1 to 8 carbon atoms, more advantageously from 2 to 5 carbon atoms.

Preferentially, $R_1$ then corresponds to the group $CH_2$—$CF_2$—$CF_2H$, and more advantageously $R_2$ is selected from $CF_2$—$CF_2H$— and $CF_2$—$CFH$—$CF_3$.

In particular, the hydrofluoroether may be selected from 1-methoxyperfluoropentane, 1-methoxyperfluorohexane, 1,1,1,2,2,3,4,5,5,5-decafluoro-3-methoxy-2-trifluoromethylpentane, 1,1,2,2-tetrafluoroethyl-2,2,3,3-tetrafluoropropylether and 1H,1H,2H',3H-decafluoro-dipropylether.

The fluorinated compound may also be a fluoro-alcohol, that is to say for the purposes of the present invention an alcohol $R_3$—OH in which some or all of the hydrogen atoms of the hydrocarbon chain $R_3$ are replaced by fluorine atoms.

According to one embodiment, the hydrocarbon chain $R_3$ may be linear or branched, advantageously saturated, and contain between 1 and 10 carbon atoms.

Preferentially, the fluoro-alcohol has at least 3 fluorine atoms, and preferably at least 5 fluorine atoms.

According to a variant embodiment, the carbon atom that carries the alcohol function is not substituted by a fluorine atom. Preferentially, said carbon atom is then bound to at least one hydrogen atom, and preferably to 2 hydrogen atoms, or alternatively a hydrogen atom and an alkyl group that has 1 to 3 carbon atoms, such as methyl.

In particular, the fluoro-alcohol may be selected from pentafluoropropanol, heptafluorobutanol and heptafluoropentan-2-ol.

According to another embodiment, the fluorinated compound may be a straight- or branched-chain fluoro-alkane having between 1 and 10 carbon atoms.

Even more advantageously, a mixture according to the invention may comprise a hydrofluoroether and a carbonyl compound, which may be more particularly as defined above.

Such mixtures are characterized by the existence of strong intermolecular hydrogen bonds: hydrofluoroether is, due to the strong electron-attracting effect of the fluorine atom, a hydrogen donor, while the carbonyl group is an acceptor. These strong electrostatic interactions promote the formation of an azeotrope with a maximum boiling point. This negative azeotropic deviation, which is not found in any refrigerant mixtures in the literature, is particularly attractive insofar as the flash point of a mixture tends to be higher the higher its boiling point, due to the intrinsic link between these two quantities. If the mixture does not have an azeotropic composition, the family cluster of dew-point and boiling-point curves is nevertheless also concave, which therefore has the same effects on the flash point.

Preferentially, a refrigerant mixture according to the invention comprises a hydrofluoroether and a carbonyl compound, said hydrofluoroether being selected from 1-methoxyperfluoropentane, 1-methoxyperfluorohexane, 1,1,1,2,2,3,4,5,5,5-decafluoro-3-methoxy-2-trifluoromethylpentane, 1,1,2,2-tetrafluoroethyl-2,2,3,3-tetrafluoropropylether and 1H,1H,2H',3H-decafluoro-dipropylether, and the carbonyl compound being selected from butyl formate, tert-butyl acetate, propyl acetate, methyl ethyl carbonate, dimethyl carbonate and pentan-3-one, said mixture having a flash point of 23° C. or above and being characterized by a low relative volatility.

Table 3 lists the compositions and characteristics of certain mixtures according to the invention, which are particularly advantageous. When the mixture has an azeotropic point, it is specified.

TABLE 3

Characteristics of HFE - carbonyl compound mixtures of the invention

| 1-Methoxyperfluoropentane | | FP (in ° C.) | $T_b$ (in ° C.) | $T_f$ (in ° C.) | $\Delta H_{vap}$ (kJ/kg) |
|---|---|---|---|---|---|
| 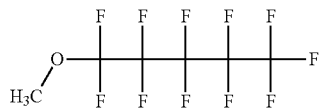 | | none | 84.9 | −69 | 105 |
| Butyl formate | | 18 | 106 | −90 | 358 |
| 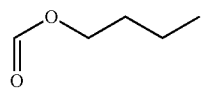 | | | | | |
| Category 3 mixture | $X_{HFE} = 0.43$ | 23 | — | — | 249 |
| Category 4 mixture | $X_{HFE} = 0.93$ | 60 | — | — | 123 |
| Dimethyl carbonate | | 17 | 90 | 4 | 366 |
| 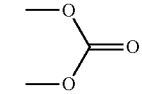 | | | | | |
| azeotrope | $X_{HFE} = 0.64$ | 28 | 96 | — | 200 |
| Category 3 mixture | $X_{HFE} = 0.5$ | 23 | 96 | — | 235 |
| Category 4 mixture | $X_{HFE} = 0.92$ | 60 | 90 | — | 126 |

TABLE 3-continued

Characteristics of HFE - carbonyl compound mixtures of the invention

| | | FP (in ° C.) | $T_b$ (in ° C.) | $T_f$ (in ° C.) | $\Delta H_{vap}$ (kJ/kg) |
|---|---|---|---|---|---|
| 1-Methoxyperfluorohexane 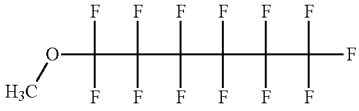 | | none | 108 | −88 | 95.4 |
| Butyl formate 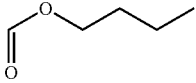 | | 18 | 106 | −90 | 358 |
| azeotrope | $X_{HFE} = 0.77$ | 31 | 112 | — | 156 |
| Category 3 mixture | $X_{HFE} = 0.48$ | 23 | 110 | — | 232 |
| Category 4 mixture | $X_{HFE} = 0.93$ | 60 | 110 | — | 114 |
| Propyl acetate 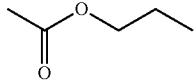 | | 14 | 102 | −95 | 332 |
| azeotrope | $X_{HFE} = 0.89$ | 41 | 109 | — | 122 |
| Category 3 mixture | $X_{HFE} = 0.65$ | 23 | — | — | 178 |
| Category 4 mixture | $X_{HFE} = 0.96$ | 60 | — | — | 105 |
| Methyl ethyl carbonate 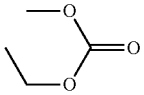 | | 23 | 107 | −53 | 352 |
| azeotrope | $X_{HFE} = 0.73$ | 39 | 114 | — | 165 |
| Category 3 mixture | $X_{HFE} = 0$ | 23 | 107 | −53 | 352 |
| Category 4 mixture | $X_{HFE} = 0.90$ | 60 | 112 | — | 121 |
| Pentan-3-one 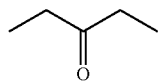 | | 13 | 102 | −39 | 388 |
| azeotrope | $X_{HFE} = 0.87$ | 37 | 109 | — | 134 |
| Category 3 mixture | $X_{HFE} = 0.7$ | 23 | — | — | 184 |
| Category 4 mixture | $X_{HFE} = 0.96$ | 60 | — | — | 108 |
| 1,1,1,2,2,3,4,5,5,5-Decafluoro-3-methoxy-2-trifluoromethylpentane 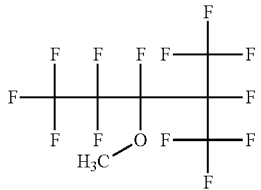 | | FP (in ° C.) none | $T_b$ (in ° C.) 98 | $T_f$ (in ° C.) −38 | $\Delta H_{vap}$ (kJ/kg) 89 |
| Butyl formate 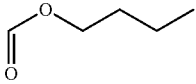 | | 18 | 106 | −90 | 358 |

TABLE 3-continued

Characteristics of HFE - carbonyl compound mixtures of the invention

| | | | | | |
|---|---|---|---|---|---|
| azeotrope | $X_{HFE} = 0.55$ | 25 | 109 | — | 210 |
| Category 3 mixture | $X_{HFE} = 0.47$ | 23 | 108 | — | 232 |
| Category 4 mixture | $X_{HFE} = 0.94$ | 60 | 102 | — | 106 |
| Tert-butyl acetate | | 14 | 96 | −58 | 285 |
| azeotrope | $X_{HFE} = 0.88$ | 36 | 99 | — | 112 |
| Category 3 mixture | $X_{HFE} = 0.67$ | 23 | — | — | 153 |
| Category 4 mixture | $X_{HFE} = 0.96$ | 60 | — | — | 97 |
| Methyl ethyl carbonate | | 23 | 107 | −53 | 352 |
| azeotrope | $X_{HFE} = 0.55$ | 31 | 111 | — | 207 |
| Category 3 mixture | $X_{HFE} = 0$ | 23 | 107 | −53 | 352 |
| Category 4 mixture | $X_{HFE} = 0.90$ | 60 | — | — | 116 |
| Dimethyl carbonate | | 17 | 90 | 4 | 366 |
| azeotrope | $X_{HFE} = 0.84$ | 41 | 101 | — | 133 |
| Category 3 mixture | $X_{HFE} = 0.8$ | 23 | — | — | 144 |
| Category 4 mixture | $X_{HFE} = 0.93$ | 60 | — | — | 110 |
| Pentan-3-one | | 13 | 102 | −39 | 388 |
| azeotrope | $X_{HFE} = 0.67$ | 22 | 105 | — | 187 |
| Category 3 mixture | $X_{HFE} = 0.70$ | 23 | − | — | 180 |
| Category 4 mixture | $X_{HFE} = 0.96$ | 60 | — | — | 101 |

| | FP (in ° C.) | $T_b$ (in ° C.) | $T_f$ (in ° C.) | $\Delta H_{vap}$ (kJ/kg) |
|---|---|---|---|---|
| 1,1,2,2-Tetrafluoroethyl-2,2,3,3-tetrafluoropropylether | none | 93 | −94 | 140 |
| Butyl formate | 18 | 106 | −90 | 358 |

| | | | | | |
|---|---|---|---|---|---|
| Category 3 mixture | $X_{HFE} = 0.43$ | 23 | 104 | — | 264 |
| Category 4 mixture | $X_{HFE} = 0.91$ | 60 | 96 | — | 159 |

TABLE 3-continued

Characteristics of HFE - carbonyl compound mixtures of the invention

| | | | | | |
|---|---|---|---|---|---|
| Tert-butyl acetate | | 14 | 96 | −58 | 285 |
| Category 3 mixture | $X_{HFE} = 0.57$ | 23 | — | — | 202 |
| Category 4 mixture | $X_{HFE} = 0.9$ | 60 | — | — | 154 |
| Propyl acetate | | 14 | 102 | −95 | 332 |
| Category 3 mixture | $X_{HFE} = 0.53$ | 23 | — | — | 230 |
| Category 4 mixture | $X_{HFE} = 0.92$ | 60 | — | — | 155 |
| Methyl ethyl carbonate | | 23 | 107 | −53 | 352 |
| Category 3 mixture | $X_{HFE} = 0$ | 23 | 107 | −53 | 352 |
| Category 4 mixture | $X_{HFE} = 0.87$ | 60 | — | — | 167 |
| Dimethyl carbonate | | 17 | 90 | 4 | 366 |
| azeotrope | $X_{HFE} = 0.73$ | 35 | 96 | — | 201 |
| Category 3 mixture | $X_{HFE} = 0.45$ | 23 | 94 | — | 264 |
| Category 4 mixture | $X_{HFE} = 0.91$ | 60 | 95 | — | 160 |
| Pentan-3-one | | 13 | 102 | −39 | 388 |
| Category 3 mixture | $X_{HFE} = 0.8$ | 23 | | | 189 |
| Category 4 mixture | $X_{HFE} = 0.96$ | 60 | | | 150 |

| | FP (in ° C.) | $T_b$ (in ° C.) | $T_f$ (in ° C.) | $\Delta H_{vap}$ (kJ/kg) |
|---|---|---|---|---|
| 1H,1H,1H,2H′,3H-Decafluorodipropylether | none | 105 | −11 | 131 |
| Butyl formate | 18 | 106 | −90 | 358 |
| azeotrope $X_{HFE} = 0.72$ | 44 | 110 | — | 195 |
| Category 3 mixture $X_{HFE} = 0.47$ | 23 | 109 | — | 251 |
| Category 4 mixture $X_{HFE} = 0.92$ | 60 | 108.5 | — | 149 |

TABLE 3-continued

Characteristics of HFE - carbonyl compound mixtures of the invention

| | | | | | |
|---|---|---|---|---|---|
| Propyl acetate | | 14 | 102 | −95 | 332 |

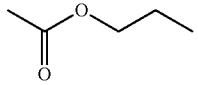

| | | | | | |
|---|---|---|---|---|---|
| azeotrope | $X_{HFE} = 0.93$ | 50 | 107 | — | 145 |
| Category 3 mixture | $X_{HFE} = 0.65$ | 23 | — | — | 202 |
| Category 4 mixture | $X_{HFE} = 0.95$ | 60 | — | — | 141 |
| Methyl ethyl carbonate | | 23 | 107 | −53 | 352 |

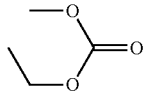

| | | | | | |
|---|---|---|---|---|---|
| azeotrope | $X_{HFE} = 0.66$ | 37 | 110 | — | 206 |
| Category 3 mixture | $X_{HFE} = 0$ | 23 | 107 | −53 | 352 |
| Category 4 mixture | $X_{HFE} = 0.89$ | 60 | — | — | 156 |
| Pentan-3-one | | 13 | 102 | −39 | 388 |

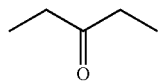

| | | | | | |
|---|---|---|---|---|---|
| azeotrope | $X_{HFE} = 0.84$ | 35 | 108 | — | 172 |
| Category 3 mixture | $X_{HFE} = 0.65$ | 23 | — | — | 221 |
| Category 4 mixture | $X_{HFE} = 0.95$ | 60 | — | — | 144 |

Advantageously, a mixture according to the invention may include a fluoro-alcohol and a carbonyl compound, the fluoro-alcohol and the carbonyl compound which may be more particularly as defined above.

Advantageously, the fluoro-alcohol is selected from pentafluoropropanol, heptafluorobutanol and heptafluoropentan-2-ol, and the carbonyl compound is selected from butyl formate, tert-butyl acetate, methyl ethyl carbonate, dimethyl carbonate and pentan-3-one.

The compositions and characteristics of some of these mixtures are shown in Table 4. When the mixture has an azeotropic point, it is specified.

TABLE 4

Characteristics of fluoroalcohol - carbonyl compound mixtures of the invention

| Pentafluoropropanol | | FP (in ° C.) | $T_b$ (in ° C.) | $T_f$ (in ° C.) | $\Delta H_{vap}$ (kJ/kg) |
|---|---|---|---|---|---|
| | | none | 80 | −3 | 206 |

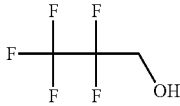

| Dimethyl carbonate | | 17 | 90 | 4 | 366 |
|---|---|---|---|---|---|

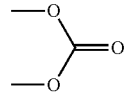

| Category 3 mixture | $X_{HFE} = 0.36$ | 23 | — | — | 308 |
|---|---|---|---|---|---|
| Category 4 mixture | $X_{HFE} = 0.89$ | 60 | — | — | 223 |

TABLE 4-continued

Characteristics of fluoroalcohol - carbonyl compound mixtures of the invention

| Heptafluorobutanol | | FP (in ° C.) | $T_b$ (in ° C.) | $T_f$ (in ° C.) | $\Delta H_{vap}$ (kJ/kg) |
|---|---|---|---|---|---|
| | | 91 | 96 | N.A. | 195 |

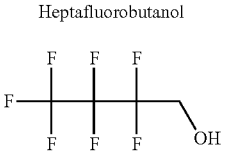

| Butyl formate | | 18 | 106 | −90 | 358 |
|---|---|---|---|---|---|

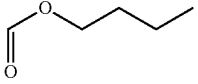

| Category 3 mixture | $X_{HFE} = 0.41$ | 23 | 103 | — | 291 |
|---|---|---|---|---|---|
| Category 4 mixture | $X_{HFE} = 0.95$ | 60 | 97 | — | 203 |
| Pentan-3-one | | 13 | 102 | −39 | 388 |

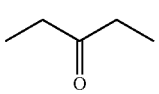

| Category 3 mixture | $X_{HFE} = 0.64$ | 23 | — | — | 265 |
|---|---|---|---|---|---|
| Category 4 mixture | $X_{HFE} = 0.96$ | 60 | — | — | 203 |

TABLE 4-continued

Characteristics of fluoroalcohol - carbonyl compound mixtures of the invention

| Heptafluoropentan-2-ol | FP (in° C.) | $T_b$ (in ° C.) | $T_f$ (in ° C.) | $\Delta H_{vap}$ (kJ/kg) |
|---|---|---|---|---|
|  | none | 100 | N.A. | 188 |
| Butyl formate | 18 | 106 | −90 | 358 |
| Category 3 mixture $X_{HFE}$ = 0.41 | 23 | 103 | — | 288 |
| Category 4 mixture $X_{HFE}$ = 0.92 | 60 | — | — | 202 |
| Methyl ethyl carbonate | 23 | 107 | −53 | 352 |
| azeotrope $X_{HFE}$ = 0.36 | 30 | 109 | — | 293 |
| Category 3 mixture $X_{HFE}$ = 0 | 23 | 107 | −53 | 352 |
| Category 4 mixture $X_{HFE}$ = 0.8 | 60 | — | — | 221 |
| Dimethyl carbonate | 17 | 90 | 4 | 366 |
| azeotrope $X_{HFE}$ = 0.85 | 36 | 101 | — | 215 |
| Category 3 mixture $X_{HFE}$ = 0.42 | 23 | — | — | 291 |
| Category 4 mixture $X_{HFE}$ = 0.9 | 60 | — | — | 206 |

Another category of refrigerant mixtures according to the invention comprises a fluoro-alcohol and an alcohol, which may be more particularly as defined above.

The hydrogen bonds in such mixtures are very weak, since both components are hydrogen donors. This favours the emergence of a positive azeotropic deviation.

Preferentially, the fluoro-alcohol is selected from pentafluoropropan-1-ol, heptafluorobutanol and heptafluoropentan-2-ol, and the alcohol is selected from ethanol, propanol and propan-2-ol.

Table 5 summarizes the compositions and characteristics of some of these mixtures. When the mixture has an azeotropic point, it is specified.

TABLE 5

Characteristics of fluoroalcohol - alcohol mixtures of the invention

| Pentafluoropropanol | FP (in ° C.) | $T_b$ (in ° C.) | $T_f$ (in ° C.) | $\Delta H_{vap}$ (kJ/kg) |
|---|---|---|---|---|
|  | none | 80 | −3 | 313 |
| ethanol | 13 | 78 | −114 | 837 |
| azeotrope $X_{HFE}$ = 0.71 | 19 | 77 | — | 465 |
| Category 3 mixture $X_{HFE}$ = 0.77 | 23 | 78 | — | 433 |
| Category 4 mixture $X_{HFE}$ = 0.98 | 60 | — | — | 324 |
| Propan-2-ol | 11 | 82 | −88 | 606 |
| Azeotrope $X_{HFE}$ = 0.8 | 23 | 78 | — | 372 |
| Category 3 mixture | | | | |
| Category 4 mixture $X_{HFE}$ = 0.98 | 60 | — | — | 319 |
| Heptafluorobutanol | FP (in ° C.) | $T_b$ (in ° C.) | $T_f$ (in ° C.) | $\Delta H_{vap}$ (kJ/kg) |
|  | 91 | 96 | N.A. | 195 |
| propanol | 25 | 97 | −124 | 690 |
| azeotrope $X_{HFE}$ = 0.72 | 29 | 92 | — | 334 |
| Category 4 mixture $X_{HFE}$ = 0.98 | 60 | — | — | 205 |
| Heptafluoropentan-2-ol | FP (in ° C.) | $T_b$ (in ° C.) | $T_f$ (in ° C.) | $\Delta H_{vap}$ (kJ/kg) |
|  | none | 100 | N.A. | 188 |
| propanol | 25 | 97 | −124 | 690 |
| azeotrope $X_{HFE}$ = 0.58 | 29 | 96 | — | 399 |
| Category 4 mixture $X_{HFE}$ = 0.97 | 60 | — | — | 203 |

The present invention further relates to the use of a mixture according to the invention as heat-transfer fluid, advantageously in a heat exchanger such as a two-phase exchanger.

It may be a capillary-pumped two-phase heat exchanger, such as heat pipes, CPL, LHP and thermosyphons, well known to the skilled person, or a mechanically-pumped two-phase loop.

More generally, the invention also concerns a heat-exchange device comprising as heat-transfer fluid a mixture according to the invention.

Said heat-exchange device may notably consist of a capillary-pumped two-phase exchanger or a mechanically-pumped two-phase loop.

The invention claimed is:

1. A refrigerant mixture consisting of a fluorinated compound and a non-fluorinated compound, wherein the fluorinated compound is a hydrofluoroether selected from 1-methoxyperfluoropentane, 1-methoxyperfluorohexane, 1,1,1,2,2,3,4,5,5,5-decafluoro-3-methoxy-2-trifluoromethylpentane, 1,1,2,2-tetrafluoroethyl-2,2,3,3-tetrafluoropropylether and 1H,1H,2H',3H-decafluoro-dipropylether, and the non-fluorinated compound has a carbonyl function and is selected from butyl formate, tert-butyl acetate, propyl acetate, methyl ethyl carbonate, dimethyl carbonate and pentan-3-one, said mixture having a flash point of 23° C. or above and being characterized by a low relative volatility.

2. A heat-exchange device comprising a heat-transfer fluid, wherein the heat-transfer fluid is a refrigerant mixture according to claim 1.

3. The heat-exchange device according to claim 2, wherein the heat-exchange device is a capillary-pumped two-phase exchanger or a mechanically-pumped two-phase loop.

4. A method of cooling, comprising producing cold by evaporating a heat-transfer fluid, wherein the heat-transfer fluid consists of a mixture according to claim 1.

5. The method of cooling according to claim 4, wherein the heat-transfer fluid circulates through a heat exchanger.

6. The method of cooling according to claim 5, wherein the heat exchanger is a capillary-pumped two-phase exchanger or a mechanically-pumped two-phase loop.

\* \* \* \* \*